US009992097B2

(12) United States Patent
Wood

(10) Patent No.: US 9,992,097 B2
(45) Date of Patent: Jun. 5, 2018

(54) SYSTEM AND METHOD FOR PIGGYBACKING ROUTING INFORMATION IN INTERESTS IN A CONTENT CENTRIC NETWORK

(71) Applicant: CISCO TECHNOLOGY, INC., San Jose, CA (US)

(72) Inventor: Christopher A. Wood, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 136 days.

(21) Appl. No.: 15/207,322

(22) Filed: Jul. 11, 2016

(65) Prior Publication Data
US 2018/0013661 A1  Jan. 11, 2018

(51) Int. Cl.
| | |
|---|---|
| G06F 15/16 | (2006.01) |
| H04L 12/733 | (2013.01) |
| H04L 12/721 | (2013.01) |
| H04L 12/755 | (2013.01) |
| H04L 12/751 | (2013.01) |

(52) U.S. Cl.
CPC .......... *H04L 45/122* (2013.01); *H04L 45/021* (2013.01); *H04L 45/025* (2013.01); *H04L 45/123* (2013.01)

(58) Field of Classification Search
CPC ... H04L 45/122; H04L 45/021; H04L 45/025; H04L 45/123
USPC ........................................................ 709/241
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| | (Continued) | |

FOREIGN PATENT DOCUMENTS

| | | |
|---|---|---|
| DE | 1720277 A1 | 6/1967 |
| DE | 19620817 A1 | 11/1997 |
| | (Continued) | |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Melvin H Pollack

(57) ABSTRACT

One embodiment provides a system that facilitates routing updates outside of a routing protocol. During operation, the system receives, by an intermediate node, a first interest that indicates an originator name which is a routable name prefix for a sender of the first interest and is used by a content producing device in a subsequent interest. In response to not obtaining a matching entry in a forwarding information base (FIB) based on the originator name, the system adds a first entry to the FIB, wherein the first entry includes the originator name as a name for the first entry and further includes an arrival interface of the first interest as an outgoing interface for the first entry. In response to receiving the subsequent interest which has a name that includes the originator name, the system forwards the subsequent interest to the outgoing interface for the first entry.

20 Claims, 8 Drawing Sheets

(56) References Cited

U.S. PATENT DOCUMENTS

| | | |
|---|---|---|
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,253,087 B2 | 2/2016 | Zhang |
| 9,280,610 B2 | 3/2016 | Gruber |
| 9,621,457 B2* | 4/2017 | Veillette ............ H04W 40/246 |
| 9,729,427 B2* | 8/2017 | Fenner ................ H04L 45/021 |
| 9,769,034 B2* | 9/2017 | Ravindran .......... H04L 41/5058 |
| 9,769,072 B2* | 9/2017 | Ravindran ............ H04L 45/72 |

(56) References Cited

U.S. PATENT DOCUMENTS

| | | | |
|---|---|---|---|
| 9,769,202 B2* | 9/2017 | Smith | H04L 63/1458 |
| 9,774,524 B2* | 9/2017 | D'Souza | H04L 45/28 |
| 9,781,028 B2* | 10/2017 | Ohnishi | H04L 45/14 |
| 9,819,637 B2* | 11/2017 | Roitshtein | H04L 45/748 |
| 9,819,643 B2* | 11/2017 | Rangarajan | H04L 61/302 |
| 9,838,327 B1* | 12/2017 | Ghosh | H04L 47/32 |
| 9,871,691 B2* | 1/2018 | Anand | H04L 41/0668 |
| 9,871,727 B2* | 1/2018 | Cheng | H04L 45/745 |
| 2002/0002680 A1 | 1/2002 | Carbajal | |
| 2002/0010795 A1 | 1/2002 | Brown | |
| 2002/0038296 A1 | 3/2002 | Margolus | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0152305 A1 | 10/2002 | Jackson | |
| 2002/0176404 A1 | 11/2002 | Girard | |
| 2002/0188605 A1 | 12/2002 | Adya | |
| 2002/0199014 A1 | 12/2002 | Yang | |
| 2003/0004621 A1 | 1/2003 | Bousquet | |
| 2003/0009365 A1 | 1/2003 | Tynan | |
| 2003/0033394 A1 | 2/2003 | Stine | |
| 2003/0046396 A1 | 3/2003 | Richter | |
| 2003/0046421 A1 | 3/2003 | Horvitz et al. | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0061384 A1 | 3/2003 | Nakatani | |
| 2003/0074472 A1 | 4/2003 | Lucco | |
| 2003/0088696 A1 | 5/2003 | McCanne | |
| 2003/0097447 A1 | 5/2003 | Johnston | |
| 2003/0099237 A1 | 5/2003 | Mitra | |
| 2003/0140257 A1 | 7/2003 | Peterka | |
| 2003/0229892 A1 | 12/2003 | Sardera | |
| 2004/0024879 A1 | 2/2004 | Dingman | |
| 2004/0030602 A1 | 2/2004 | Rosenquist | |
| 2004/0064737 A1 | 4/2004 | Milliken | |
| 2004/0071140 A1 | 4/2004 | Jason | |
| 2004/0073617 A1 | 4/2004 | Milliken | |
| 2004/0073715 A1 | 4/2004 | Folkes | |
| 2004/0139230 A1 | 7/2004 | Kim | |
| 2004/0196783 A1 | 10/2004 | Shinomiya | |
| 2004/0221047 A1 | 11/2004 | Grover | |
| 2004/0225627 A1 | 11/2004 | Botros | |
| 2004/0233916 A1 | 11/2004 | Takeuchi | |
| 2004/0246902 A1 | 12/2004 | Weinstein | |
| 2004/0252683 A1 | 12/2004 | Kennedy | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0074001 A1 | 4/2005 | Mattes | |
| 2005/0132207 A1 | 6/2005 | Mourad | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0281288 A1 | 12/2005 | Banerjee | |
| 2005/0286535 A1 | 12/2005 | Shrum | |
| 2005/0289222 A1 | 12/2005 | Sahim | |
| 2006/0010249 A1 | 1/2006 | Sabesan | |
| 2006/0029102 A1 | 2/2006 | Abe | |
| 2006/0039379 A1 | 2/2006 | Abe | |
| 2006/0051055 A1 | 3/2006 | Ohkawa | |
| 2006/0072523 A1 | 4/2006 | Richardson | |
| 2006/0099973 A1 | 5/2006 | Nair | |
| 2006/0129514 A1 | 6/2006 | Watanabe | |
| 2006/0133343 A1 | 6/2006 | Huang | |
| 2006/0146686 A1 | 7/2006 | Kim | |
| 2006/0173831 A1 | 8/2006 | Basso | |
| 2006/0193295 A1 | 8/2006 | White | |
| 2006/0203804 A1 | 9/2006 | Whitmore | |
| 2006/0206445 A1 | 9/2006 | Andreoli | |
| 2006/0215684 A1 | 9/2006 | Capone | |
| 2006/0223504 A1 | 10/2006 | Ishak | |
| 2006/0242155 A1 | 10/2006 | Moore | |
| 2006/0256767 A1 | 11/2006 | Suzuki | |
| 2006/0268792 A1 | 11/2006 | Belcea | |
| 2007/0019619 A1 | 1/2007 | Foster | |
| 2007/0073888 A1 | 3/2007 | Madhok | |
| 2007/0094265 A1 | 4/2007 | Korkus | |
| 2007/0112880 A1 | 5/2007 | Yang | |
| 2007/0124412 A1 | 5/2007 | Narayanaswami | |
| 2007/0127457 A1 | 6/2007 | Mirtorabi | |
| 2007/0160062 A1 | 7/2007 | Morishita | |
| 2007/0162394 A1 | 7/2007 | Zager | |
| 2007/0171828 A1 | 7/2007 | Dalal | |
| 2007/0189284 A1 | 8/2007 | Kecskemeti | |
| 2007/0195765 A1 | 8/2007 | Heissenbuttel | |
| 2007/0204011 A1 | 8/2007 | Shaver | |
| 2007/0209067 A1 | 9/2007 | Fogel | |
| 2007/0239892 A1 | 10/2007 | Ott | |
| 2007/0240207 A1 | 10/2007 | Belakhdar | |
| 2007/0245034 A1 | 10/2007 | Retana | |
| 2007/0253418 A1 | 11/2007 | Shiri | |
| 2007/0255677 A1 | 11/2007 | Alexander | |
| 2007/0255699 A1 | 11/2007 | Sreenivas | |
| 2007/0255781 A1 | 11/2007 | Li | |
| 2007/0274504 A1 | 11/2007 | Maes | |
| 2007/0275701 A1 | 11/2007 | Jonker | |
| 2007/0276907 A1 | 11/2007 | Maes | |
| 2007/0283158 A1 | 12/2007 | Danseglio | |
| 2007/0294187 A1 | 12/2007 | Scherrer | |
| 2008/0005056 A1 | 1/2008 | Stelzig | |
| 2008/0005223 A1 | 1/2008 | Flake | |
| 2008/0010366 A1 | 1/2008 | Duggan | |
| 2008/0037420 A1 | 2/2008 | Tang | |
| 2008/0043989 A1 | 2/2008 | Furutono | |
| 2008/0046340 A1 | 2/2008 | Brown | |
| 2008/0059631 A1 | 3/2008 | Bergstrom | |
| 2008/0080440 A1 | 4/2008 | Yarvis | |
| 2008/0082662 A1 | 4/2008 | Dandliker | |
| 2008/0101357 A1 | 5/2008 | Lovanna | |
| 2008/0107034 A1 | 5/2008 | Jetcheva | |
| 2008/0107259 A1 | 5/2008 | Satou | |
| 2008/0123862 A1 | 5/2008 | Rowley | |
| 2008/0133583 A1 | 6/2008 | Artan | |
| 2008/0133755 A1 | 6/2008 | Pollack | |
| 2008/0151755 A1 | 6/2008 | Nishioka | |
| 2008/0159271 A1 | 7/2008 | Kutt | |
| 2008/0165775 A1 | 7/2008 | Das | |
| 2008/0186901 A1 | 8/2008 | Itagaki | |
| 2008/0200153 A1 | 8/2008 | Fitzpatrick | |
| 2008/0215669 A1 | 9/2008 | Gaddy | |
| 2008/0216086 A1 | 9/2008 | Tanaka | |
| 2008/0243992 A1 | 10/2008 | Jardetzky | |
| 2008/0250006 A1 | 10/2008 | Dettinger | |
| 2008/0256138 A1 | 10/2008 | Sim-Tang | |
| 2008/0256359 A1 | 10/2008 | Kahn | |
| 2008/0270618 A1 | 10/2008 | Rosenberg | |
| 2008/0271143 A1 | 10/2008 | Stephens | |
| 2008/0287142 A1 | 11/2008 | Keighran | |
| 2008/0288580 A1 | 11/2008 | Wang | |
| 2008/0298376 A1 | 12/2008 | Takeda | |
| 2008/0320148 A1 | 12/2008 | Capuozzo | |
| 2009/0006659 A1 | 1/2009 | Collins | |
| 2009/0013324 A1 | 1/2009 | Gobara | |
| 2009/0022154 A1 | 1/2009 | Kiribe | |
| 2009/0024641 A1 | 1/2009 | Quigley | |
| 2009/0030978 A1 | 1/2009 | Johnson | |
| 2009/0037763 A1 | 2/2009 | Adhya | |
| 2009/0052660 A1 | 2/2009 | Chen | |
| 2009/0067429 A1 | 3/2009 | Nagai | |
| 2009/0077184 A1 | 3/2009 | Brewer | |
| 2009/0092043 A1 | 4/2009 | Lapuh | |
| 2009/0097631 A1 | 4/2009 | Gisby | |
| 2009/0103515 A1 | 4/2009 | Pointer | |
| 2009/0113068 A1 | 4/2009 | Fujihira | |
| 2009/0116393 A1 | 5/2009 | Hughes | |
| 2009/0117922 A1 | 5/2009 | Bell | |
| 2009/0132662 A1 | 5/2009 | Sheridan | |

(56) References Cited

U.S. PATENT DOCUMENTS

| | | |
|---|---|---|
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0139245 A1 | 5/2013 | Thomas |
| 2013/0151584 A1 | 6/2013 | Westphal |

(56) References Cited

U.S. PATENT DOCUMENTS

| | | |
|---|---|---|
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2017/0093691 A1* | 3/2017 | Garcia-Luna-Aceves ........... H04L 45/12 |
| 2017/0093713 A1* | 3/2017 | Garcia-Luna-Aceves ........... H04L 45/50 |
| 2017/0230282 A1* | 8/2017 | Liu ..................... H04L 45/72 |
| 2017/0289013 A1* | 10/2017 | Haas .................... H04L 45/021 |
| 2017/0289296 A1* | 10/2017 | Prieditis ............. H04L 67/2842 |
| 2017/0302578 A1* | 10/2017 | Gattani ............... H04L 45/7453 |
| 2017/0324647 A1* | 11/2017 | Anand ................. H04L 45/021 |
| 2017/0346689 A1* | 11/2017 | Miller ................ H04L 41/0816 |
| 2018/0013624 A1* | 1/2018 | Miller ................ H04L 43/50 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| EP | 2323346 | 5/2011 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

(56) References Cited

OTHER PUBLICATIONS

Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (Pursuit)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heal pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and AJ M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.

(56) References Cited

OTHER PUBLICATIONS

Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer ScienceVolume 5443 (2009).
V. Jacobson et al., 'Networking Named Content,' Proc. IEEE CoNEXT '09, Dec. 2009.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for CCN," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," in Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

(56) References Cited

OTHER PUBLICATIONS

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: an Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
J. Lotspiech, S. Nusser, and F. Pestoni. Anonymous Trust: Digit. RTMP (2009). Available online at http://wwwimages.adobe.com/www.adobe.com/content/dam/Adobe/en/devnet/rtmp/ pdf/rtmp specification 1.0.pdf.
S. Kamara and K. Lauter. Cryptographic Cloud Storage. Financial Cryptography and Data Security. Springer Berlin Heidelberg (2010).
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12,2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

(56) References Cited

OTHER PUBLICATIONS

Xie et al. "Collaborative Forwarding and Caching in Content Centric Networks", Networking 2012.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 3, 2011 (Jul. 3, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocor%20Introduction.pdf *paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]—[006], [0011], [0013]* *figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

* cited by examiner

FIG. 2A

Name 202: /c/oldprefix/adv/data/a/b
OriginatorName 204: <null>
HopCount 206: <x>
ReverseRouteUpdate 208: <null>

INTEREST/ADVERTISEMENT 200

FIG. 2B

FORWARDING INFORMATION BASE 220

| Name Prefix 222 | Outgoing Interfaces 224 | Distance to Originator 226 |
|---|---|---|
| /c/oldprefix | {IF_108, ...} | <null> |
| /p/name | {IF_112, ...} | <null> |

ENTRY 220.1

FIG. 2C

Name 242: /p/nameprefix/data/a/b
OriginatorName 244: /c/newprefix
HopCount 246: 4
ReverseRouteUpdate 248: <data>

INTEREST 240

FIG. 2D

FORWARDING INFORMATION BASE 260

| Name Prefix 222 | Outgoing Interfaces 224 | Distance to Originator 226 |
|---|---|---|
| /c/oldprefix | {IF_108, ...} | <null> |
| /p/nameprefix | {IF_112, ...} | <null> |
| /c/newprefix | {IF_102, ...} | 256 - 4 |

ENTRY 220.1
ENTRY 260.1

FIG. 2E

Name 282: /c/newprefix/request/info/a/b
OriginatorName 284: <null>
HopCount 286: <y>
ReverseRouteUpdate 288: <null>

INTEREST/ADVERTISEMENT 280

SYSTEM AND METHOD FOR PIGGYBACKING ROUTING INFORMATION IN INTERESTS IN A CONTENT CENTRIC NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/579,925, entitled "SYSTEM AND METHOD FOR EFFICIENT NAME-BASED CONTENT ROUTING USING LINK-STATE INFORMATION IN INFORMATION-CENTRIC NETWORKS," by inventor Jose J. Garcia-Luna-Aceves, filed 22 Dec. 2014 (hereinafter "U.S. patent application Ser. No. 14/579,925");

the disclosures of which are herein incorporated by reference in their entirety.

BACKGROUND

Field

This disclosure is generally related to distribution of digital content. More specifically, this disclosure is related to a system and method for facilitating proactive routing updates by piggybacking routing information in interests.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A CCN data packet (such as an interest or content object) is routed based on its name. A name can include a name prefix, which is one or more of the contiguous name components starting from the most general level. In some CCN routing protocols, a producer advertises a name prefix to receive interests under a particular domain. The routing protocol propagates the name prefix, where the corresponding routing information traverses the network from the origin (e.g., the producer) to the destination (e.g., the consumer) following the shortest possible path. The overall time for the routing information propagation is based on the number of hops along the path from the producer to the consumer, as well as the frequency at which the routing updates are propagated. Thus, long routes or infrequent route updates may result in routes taking a long time to be set in the network. However, in the case where consumers and producers engage in bilateral communication using two-way interests, or in the case where consumers are mobile and use rapidly changing or random prefixes for receiving interests, the long time necessary for successful routing information propagation may result in errors (e.g., dropped packets) or inefficient or additional communication (e.g., re-expressed interests).

SUMMARY

One embodiment provides a system that facilitates proactive routing updates outside of a routing protocol. During operation, the system receives, by an intermediate node, a first interest that indicates an originator name, wherein a name is a hierarchically structured variable length identifier that includes contiguous name components ordered from a most general level to a most specific level, wherein the originator name is a routable name prefix for a sender of the first interest and is used by a content producing device in a subsequent interest. In response to not obtaining a matching entry in a forwarding information base based on the originator name, the system adds a first entry to the forwarding information base, wherein the first entry includes the originator name as a name for the first entry and further includes an arrival interface of the first interest as an outgoing interface for the first entry. In response to receiving the subsequent interest which has a name that includes the originator name, the system forwards the subsequent interest to the outgoing interface for the first entry, thereby facilitating the intermediate node to proactively update routing information outside of the routing protocol and based on routing information included in the first interest.

In some embodiments, in response to receiving the subsequent interest, the system performs a lookup in the forwarding information base based on the originator name to obtain the first entry.

In some embodiments, the first interest includes a hop count, and the first entry further includes a distance to the sender as a value based on the hop count.

In some embodiments, the first interest includes a reverse route update which indicates routing information from a neighbor node of the intermediate node, wherein the reverse route update is for one or more name prefixes. The system inserts the indicated routing information into a control process for a local routing algorithm, wherein the control process handles route updates from neighbor nodes.

In some embodiments, in response to obtaining the matching entry in the forwarding information base based on the originator name, the system adds to the matching entry the arrival interface of the first interest as an outgoing interface for the matching entry.

In some embodiments, the first interest has a name. In response to determining that the originator name indicated in the first interest is null, the system forwards the first interest to one or more outgoing interfaces indicated in the forwarding information base and corresponding to the name for the first interest. The system can also forward the first interest to the one or more outgoing interfaces indicated in the forwarding information base and corresponding to the name for the first interest.

In some embodiments, receiving the first interest is in response to an advertisement of the content producing device for content under a domain of the content producing device. The advertisement is an interest which does not require a responsive content object and does not leave state information in a pending interest table.

Another embodiment provides a system that facilitates proactive routing updates outside of a routing protocol. During operation, the system receives, by a content producing device, a first interest that indicates an originator name, wherein a name is a hierarchically structured variable length identifier that includes contiguous name components ordered from a most general level to a most specific level, wherein the originator name is a routable name prefix for a sender of the first interest and is used by the content producing device in a subsequent interest. In response to not obtaining a matching entry in a forwarding information base based on the originator name, the system adds a first entry to the forwarding information base, wherein the first entry includes the originator name as a name for the first entry and further includes an arrival interface of the first interest as an outgoing interface for the first entry. The system generates the subsequent interest which has a name that includes the originator name. The system forwards the subsequent interest to the outgoing interface for the first entry, thereby facilitating the content producing device to proactively update routing information outside of the routing protocol and based on routing information included in the first interest.

In some embodiments, in response to determining that the originator name indicated in the first interest is null, the system processes the first interest. The system can also perform a lookup in the forwarding information base based on the originator name to obtain the first entry.

In some embodiments, the system generates an advertisement for content under a domain of the content producing device, wherein the advertisement is an interest which does not require a responsive content object and does not leave state information in a pending interest table, and wherein receiving the first interest is in response to generating the advertisement.

BRIEF DESCRIPTION OF THE FIGURES

FIG. 2A illustrates an exemplary interest or advertisement, in accordance with an embodiment of the present invention.

FIG. 2B illustrates an exemplary forwarding information base populated by a routing protocol, in accordance with an embodiment of the present invention.

FIG. 2C illustrates an exemplary interest which facilitates proactive routing updates, in accordance with an embodiment of the present invention.

FIG. 2D illustrates an exemplary forwarding information base after receiving and processing the interest of FIG. 2C, in accordance with an embodiment of the present invention.

FIG. 2E illustrates an exemplary interest or advertisement, generated in response to receiving the interest of FIG. 2C and proactively updating the forwarding information base as in FIG. 2D, in accordance with an embodiment of the present invention.

In the figures, like reference numerals refer to the same figure elements.

DETAILED DESCRIPTION

Figure 1A:
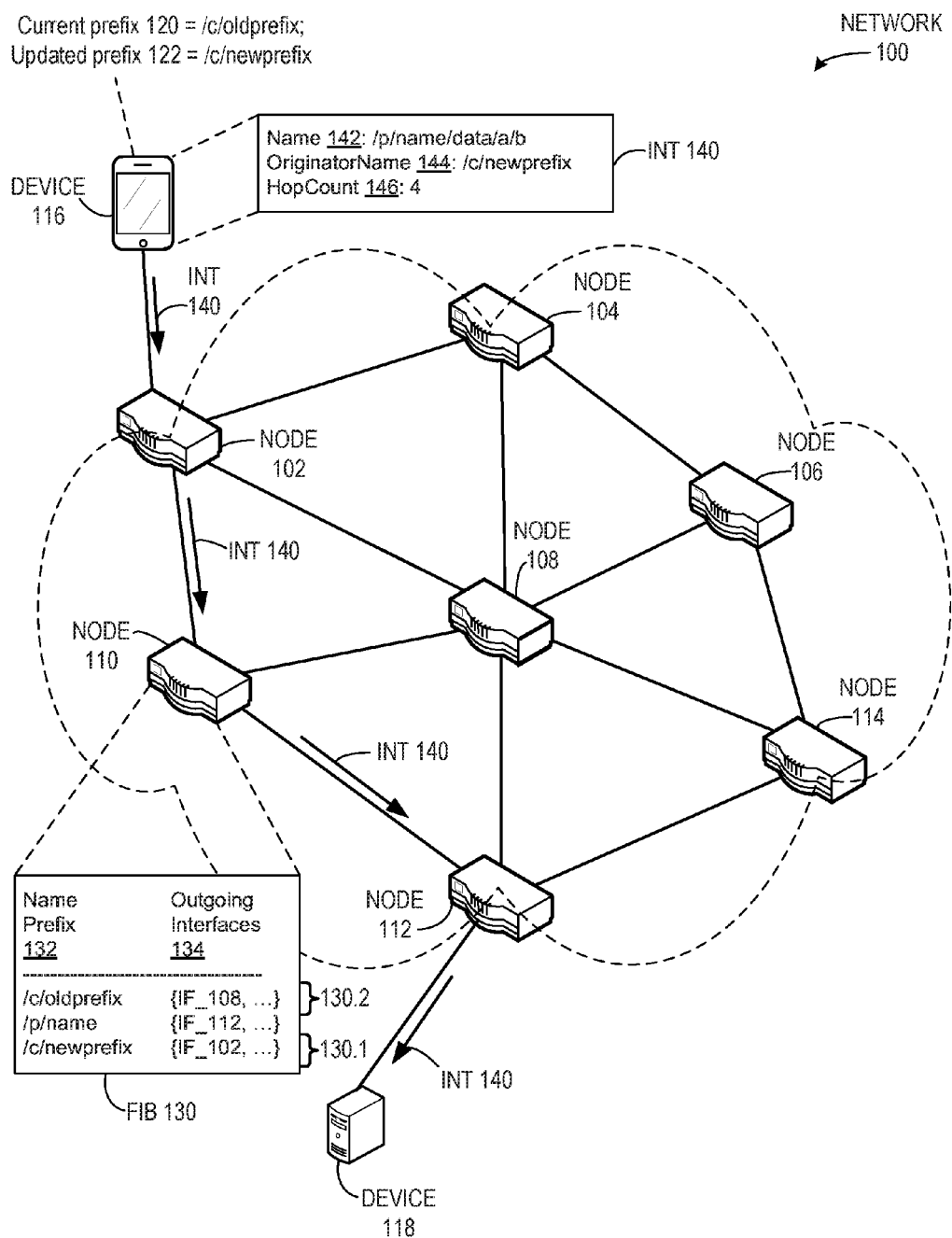
FIG. 1A illustrates an exemplary network which facilitates proactive routing updates, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of lengthy routing information propagation (e.g., distance or frequency based routing protocols) for rapidly changing consumer prefixes by proactively piggybacking routing information in interests. A CCN data packet (such as an interest or content object) is routed based on its name. In some CCN routing protocols (such as Distance-based Content Routing, or DCR), a producer advertises a name prefix to receive interests under a particular domain. The routing protocol propagates the name prefix, where the corresponding routing information traverses the network from the origin (e.g., the producer) to the destination (e.g., the consumer) following the shortest possible path. The overall time for the routing information propagation is based on the number of hops along the path from the producer to the consumer, as well as on the frequency at which the routing updates are propagated. Thus, long routes or infrequent route updates may result in routes taking a long time to be set in the network. DCR and content routing based on link-state information is described in U.S. patent application Ser. No. 14/579,925.

However, in the case where consumers and producers engage in bilateral communication using two-way interests, or in the case where consumers are mobile and use rapidly changing or random prefixes for receiving interests, the long time necessary for successful routing information propagation may result in errors or inefficient communication, such as dropped packets or re-expressed interests, respectively. For example, at a time T1, a consumer can issue a first interest to a producer, where it is assumed that intermediate routers along the path from the consumer to the producer contain the appropriate FIB entries to route the first interest. At a time T2, the producer may follow the first interest by sending a second interest to the consumer. However, the consumer may change its prefix at time T2, where the routing update propagates to in-path routers only at a time T3, which is after the time T2 that the producer sent its second interest. This results in the second interest being dropped at an intermediate router, because the intermediate router does not have an available FIB entry indicating where to forward the second interest. Alternatively, the producer can transmit to the consumer an interest which contains an advertisement for content under the producer's domain. Such an "advertisement" interest reaches the consumer based on information in the intermediate routers' FIBs. However, if the consumer changes its prefix and the routing information propagation takes a long time, subsequent advertisement interests from the producer may not reach the consumer.

Embodiments of the present invention solve these problems by allowing a consumer to include in an interest either the consumer's prefix or a new route update from the consumer's local forwarder. For example, an interest can carry the prefix of the consumer (e.g., the originator or the originating entity) as a separate CCNxName field, "OriginatorName." A forwarder or router that receives an interest with an OriginatorName can create (if necessary) a new FIB entry with the OriginatorName that points to the arrival interface of the interest. The new FIB entry can also contain the distance to the originator as the value "256–hc," where hc is the hop count in the interest. Alternatively, an interest can carry the DCR update of a local forwarder or router in a separate field, "ReverseRouteUpdate." The DCR update can include more than a single prefix. A forwarder or router that receives an interest with a ReverseRouteUpdate can insert this information into the control process for the local routing algorithm (i.e., the process that is responsible for handling route updates from neighbors).

Embodiments of the present invention allow the consumer to proactively include routing information in an interest, which allows upstream routers that receive the interest to update their FIBs outside of the routing protocol and based on the routing information included in the interest. Thus, the present system provides improvements to the distribution of digital content, where the improvements are fundamentally technological. Embodiments of the present invention provide a technological solution (e.g., piggybacking routing information in interests to allow upstream routers to proactively update FIB entries) to the technological problem of the efficient, secure, and effective distribution of digital content.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

Face or Interface (or "face" or "interface"): In CCN, the term "face" is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the terms "face" and "interface," referring to an incoming or outgoing interface of an Interest.

"Prefix": In this disclosure, the term "prefix" can be used to refer to either a name of a specific content object or a name prefix for the content object. A routable name prefix can determine the routing of a packet that indicates a request for a piece of data, and includes a name (or a name prefix) for the piece of data. A data consumer can disseminate a request or interest across an information-centric network, which CCN/NDN routers can propagate toward a storage device (e.g., a cache server) or a data producer that can provide the requested data to satisfy the request or interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1A illustrates an exemplary network which facilitates proactive routing updates, in accordance with an embodiment of the present invention. Network 100 can include a consumer or content requesting device 116, a producer or content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network.

Consumer or device 116 can have a current prefix 120 of "/c/oldprefix." Current prefix 120 can be a routable name prefix which, via a propagation of routing information based on a routing protocol, is included in the appropriate FIBs of routers in network 100, as described below in relation to FIG. 2B. Consumer 116 can be a mobile device or a consumer that uses a random name prefix for receiving interests. Consumer 116 can determine to change its name prefix (or detect an updated name prefix) from a current prefix 120 of "/c/oldprefix" to an updated prefix 122 of "/c/newprefix." Consumer 116 can generate an interest 140 with a name 142 of "/p/name/data/a/b," an originator name 144 of "/c/newprefix," and a hop count 146 with a value of "4." Interest 140 can be in response to an advertisement sent by a producer (not shown). Interest 140 can travel through network 100 via intermediate nodes 102, 110, and 112 before reaching producer or device 118. Each of these intermediate nodes can update their FIBs based on the proactive routing information included in interest 140. For example, node 110 can receive interest 140, and (if no matching entry exists), create a new entry 130.1 in its FIB that includes originator name 144 as a name prefix 132, and further includes an arrival interface corresponding to interest 140 (e.g., "IF_102") as one of outgoing interfaces 134. Note that an entry 130.2 for the old prefix (e.g., current prefix 120) of consumer 116 already exists in FIB 130 because a routing protocol has already propagated the information in entry 130.2 through the network. Consumer 116 can forward interest 140 onwards based on information in its FIB corresponding to interest name 142 of interest 140. Similarly, producer 118 can receive interest 140 and add (if no matching exists) a new entry to its FIB (not shown) similar to entry 130.1 of FIB 130 of node 110.

Note that consumer 116 can send interest 140 immediately after consumer 116 updates it routable name or changes locations. For example, consumer 116 may have been previously connected to node 104, with a path to producer 118 via nodes 104, 108, and 112 already determined based on a propagation of routing information via the routing protocol (e.g., as shown by outgoing interface 134 of entry 130.2 in FIB 130, where "IF_108" is listed as an outgoing interface corresponding to the name prefix of "/c/oldprefix"). In the absence of the present system, a subsequent interest sent from producer 118 to consumer 116 using the old name of "/c/oldprefix" may not reach consumer 118. This may occur if the routing protocol has not had sufficient time to propagate the routing updates through the network (e.g., when producer 118 sends an interest to the old prefix before all intermediate routers have updated their FIBs accordingly).

Figure 1B:
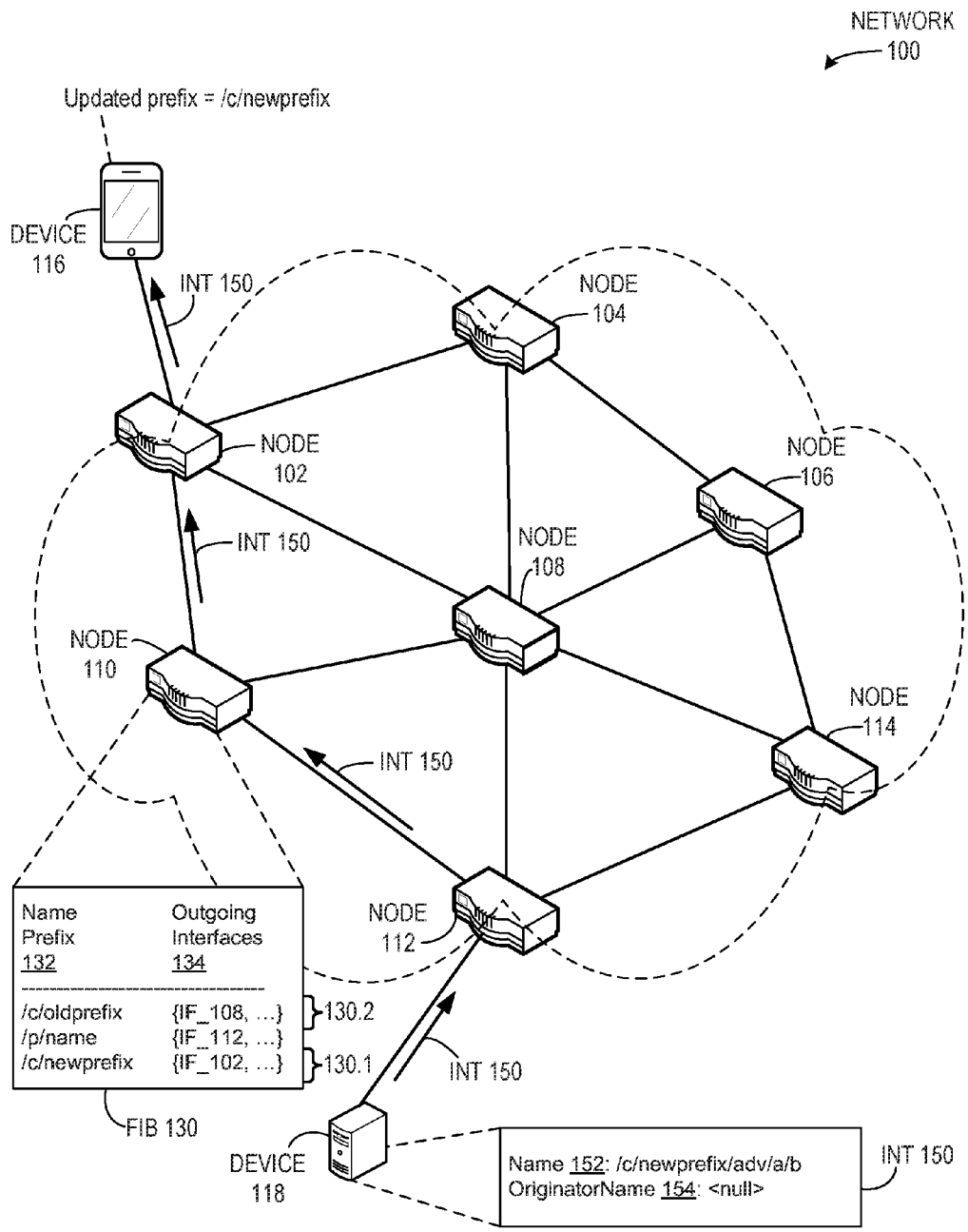
FIG. 1B illustrates an exemplary network which facilitates proactive routing updates, in accordance with an embodiment of the present invention.

Producer 118 may subsequently generate an interest with a name that includes originator name 144 of interest 140. FIG. 1B illustrates exemplary network 100 which facilitates proactive routing updates, in accordance with an embodiment of the present invention. Producer 118 can generate an interest 150 with a name 152 of "/c/newprefix/adv/a/b," where name 152 includes originator name 144 (i.e., "/c/newprefix") previously received and included in interest 140. Interest 150 can be a regular CCN interest or an advertisement that does not require a responsive content object. Interest 150 is routed through network 100 based on the updated routing information in the FIBs of the intermediate routers (e.g., nodes 112, 110, and 102). For example, node 110 can receive interest 150, perform a lookup in its FIB for name 152, determine (based on a longest prefix match) a matching FIB entry 130.1 for a name prefix 132 with a value of "/c/newprefix," and transmit interest 150 via the corresponding outgoing interfaces 134 (e.g., "IF_102") for FIB entry 130.1.

Thus, the system updates the FIBs with routing information included in or determined from an interest which includes the updated name prefix for the consumer. The updated FIBs ensure that a subsequent interest from the producer (or any entity), where the subsequent interest includes the updated and "piggybacked" name prefix, reaches the consumer even after the consumer has updated or changed its routable name prefix. The system thus facilitates routing updates outside of the routing protocol, which can be beneficial in the circumstances described above.

Exemplary Interests and Forwarding Information Bases

FIG. 2A illustrates an exemplary interest or advertisement 200, in accordance with an embodiment of the present invention. Interest or advertisement 200 can include a name 202 of "/c/oldprefix/adv/data/a/b," an originator name 204 with a "null" value, a hop count 206 with a value of "x," and a reverse route update 208 with a "null" value. Interest or advertisement 200 can be transmitted by a producer based on name 202. Interest or advertisement 200 can be routed through a network based on routing information in the FIBs of intermediate routers in the network.

FIG. 2B illustrates an exemplary forwarding information base 220 populated by a routing protocol, in accordance with an embodiment of the present invention. FIB 220 can include entries with a name prefix 222, outgoing interfaces 224, and a distance to originator 226. For example, an entry 220.1 in FIB 220 can include a name prefix of "/c/oldprefix," outgoing interfaces which include "IF_108" (e.g., the interface corresponding to node 108), and a distance to originator with a "null" value. FIB 220, including entry 220.1, illustrates the state of a FIB which has been populated by the routing protocol.

FIG. 2C illustrates an exemplary interest 240 which facilitates proactive routing updates, in accordance with an embodiment of the present invention. Interest 240 can include a name 242 of "/p/nameprefix/data/a/b," an originator name 244 with a value of "/c/newprefix," a hop count 246 with a value of "4," and a reverse route update 248 with value of "data." Interest 240 can be transmitted by a consumer who determines to change its name prefix and wishes to piggyback routing information in an interest to a producer (e.g., in FIG. 1A, device 116 changes its name prefix from current prefix 120 to updated prefix 122, and generates interest 140 which includes originator name 144).

FIG. 2D illustrates an exemplary forwarding information base 260 after receiving and processing the interest of FIG. 2C, in accordance with an embodiment of the present invention. Similar to FIB 220 of FIG. 2B, FIB 260 can include entries with a name prefix 222, outgoing interfaces 224, and a distance to originator 226. FIB 260 illustrates the state of a FIB after receiving and processing an interest which includes an originator name (e.g., interest 240 of FIG.

2C). Thus, FIB 260 can include entry 220.1 (as previously described in relation to FIB 220 of FIG. 2B), and can further include an entry 260.1, which is created upon processing interest 240. Entry 260.1 can include a name prefix of "/c/newprefix," outgoing interfaces that include "IF_102" (e.g., the arrival interface corresponding to the node from which interest 140 is received), and a distance to originator with a value equal to "256–hc," where hc is the hop count included in the interest being processed (e.g., hop count 246 of interest 240).

FIG. 2E illustrates an exemplary interest or advertisement 280, generated in response to receiving the interest of FIG. 2C and proactively updating the forwarding information base as in FIG. 2D, in accordance with an embodiment of the present invention. Interest or advertisement 280 can include a name 282 of "c/newprefix/request/info/a/b," an originator name 284 with a "null" value, a hop count 286 with a value of "y," and a reverse route update 288 with a "null" value. Interest or advertisement 280 can be transmitted by a producer based on name 282, which includes the originator name included in a previously received interest (e.g., interest 240). Interest or advertisement 280 can be successfully routed through a network based on routing information in the FIBs of intermediate routers in the network.

Intermediate Router Processes Interest with Routing Information

Figure 3A:
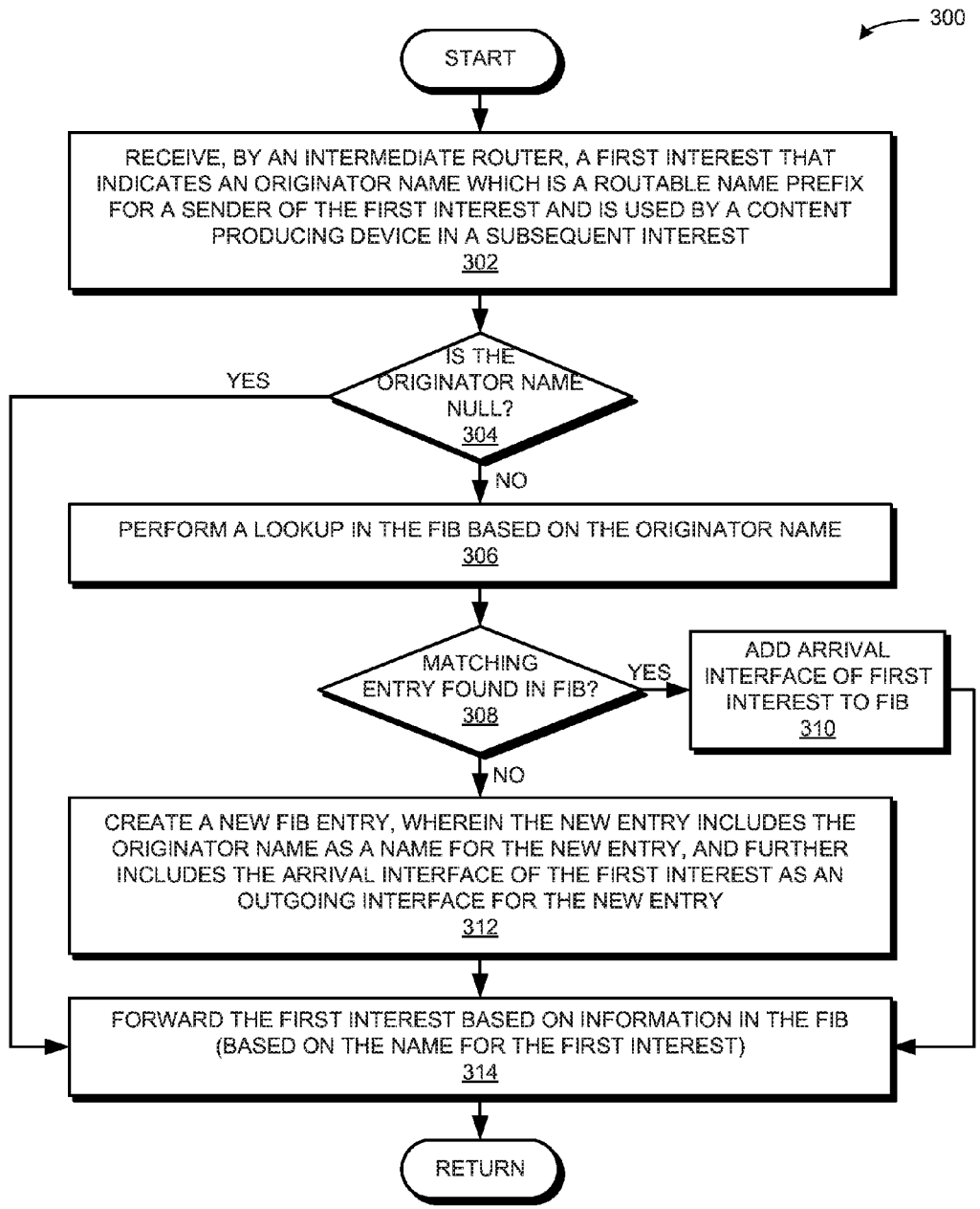
FIG. 3A presents a flow chart illustrating a method by an intermediate router for processing an interest which includes proactive routing information, in accordance with an embodiment of the present invention.

FIG. 3A presents a flow chart 300 illustrating a method by an intermediate router for processing an interest which includes proactive routing information, in accordance with an embodiment of the present invention. During operation, the system receives, by an intermediate router, a first interest that indicates an originator name which is a routable name prefix for a sender of the first interest and is used by a content producing device in a subsequent interest (operation 302). A name can be a hierarchically structured variable length identifier that includes contiguous name components ordered from a most general level to a most specific level, and the first interest can include a name. If the originator name is null (decision 304), the system forwards the first interest based on information in the FIB of the intermediate router, which information is based on the name for the first interest (operation 314). If the originator name is not null (decision 304), the system performs a lookup in the FIB based on the originator name (operation 306). If a matching entry is found in the FIB (decision 308), the system adds the arrival interface of the first interest to the FIB (operation 310), and then forwards the first interest based on information in the FIB (based on the name for the first interest) (operation 314).

If a matching entry is not obtained or found in the FIB (decision 308), the system creates or adds a new FIB entry, wherein the new entry includes the originator name as a name for new entry, and further includes the arrival interface of the first interest as an outgoing interface for the new entry (operation 312). The system then forwards the first interest based on information in the FIB (based on the name for the first interest) (operation 314).

Figure 3B:
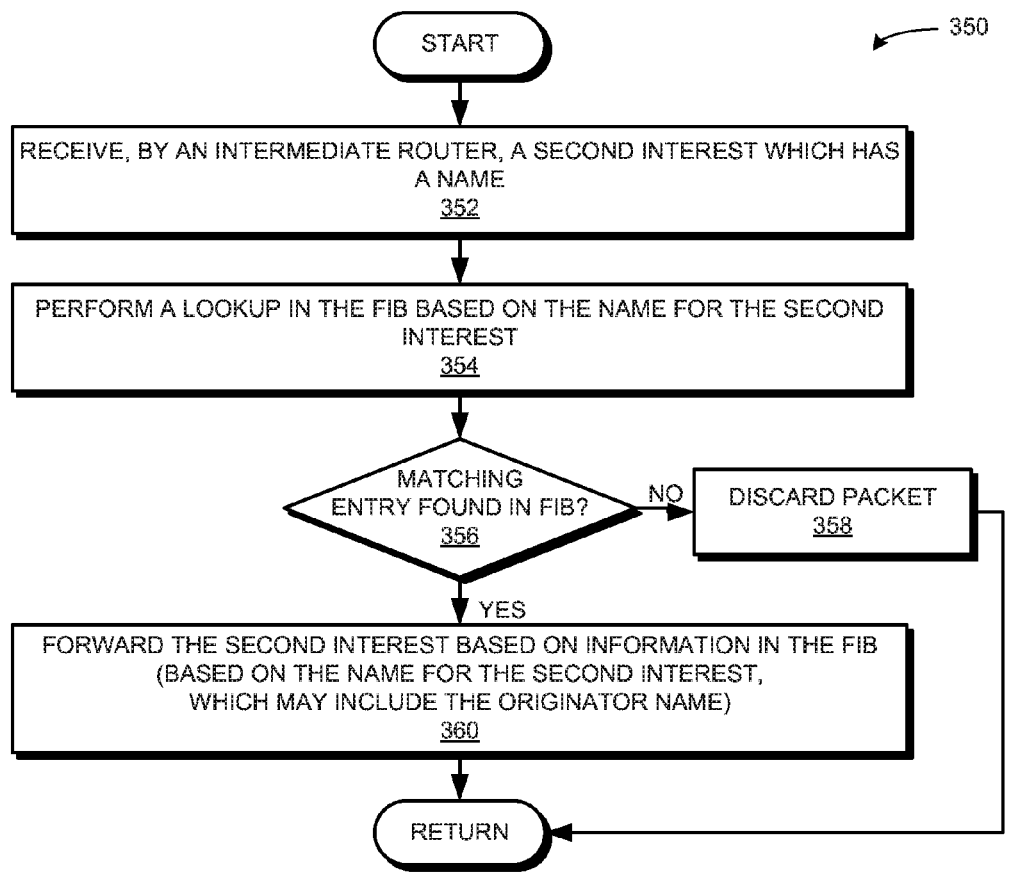
FIG. 3B presents a flow chart illustrating a method by an intermediate router for processing an interest subsequent to the method depicted in FIG. 3A, in accordance with an embodiment of the present invention.

FIG. 3B presents a flow chart 350 illustrating a method by an intermediate router for processing an interest subsequent to the method depicted in FIG. 3A, in accordance with an embodiment of the present invention. During operation, the system receives, by an intermediate node, a second interest which has a name (operation 352). The name for the second interest can include the originator name as a routable name prefix. The second interest can be an advertisement that does not leave any state information in a pending interest table. The system performs a lookup in the FIB based on the name for the second interest (operation 354). If a matching entry is not found in the FIB (decision 356), the system discards the packet (operation 358). If a matching entry is found in the FIB (decision 356), the system forwards the second interest based on information in its FIB (based on the name for the second interest, which name may include the originator name) (operation 360).

Note that the operations described in FIG. 350 include standard processing of interests, including looking up routing information in the FIB. The main difference is that in decision 356 and operation 360, the FIB includes an entry for the originator name, which was inserted by the router into the FIB while processing a previously received interest (e.g., the first interest of FIG. 3A). This insertion occurs outside of the routing protocol, and thus allows the system to facilitate proactive routing updates.

Content Producing Device Processes Interest with Routing Information

Figure 4:
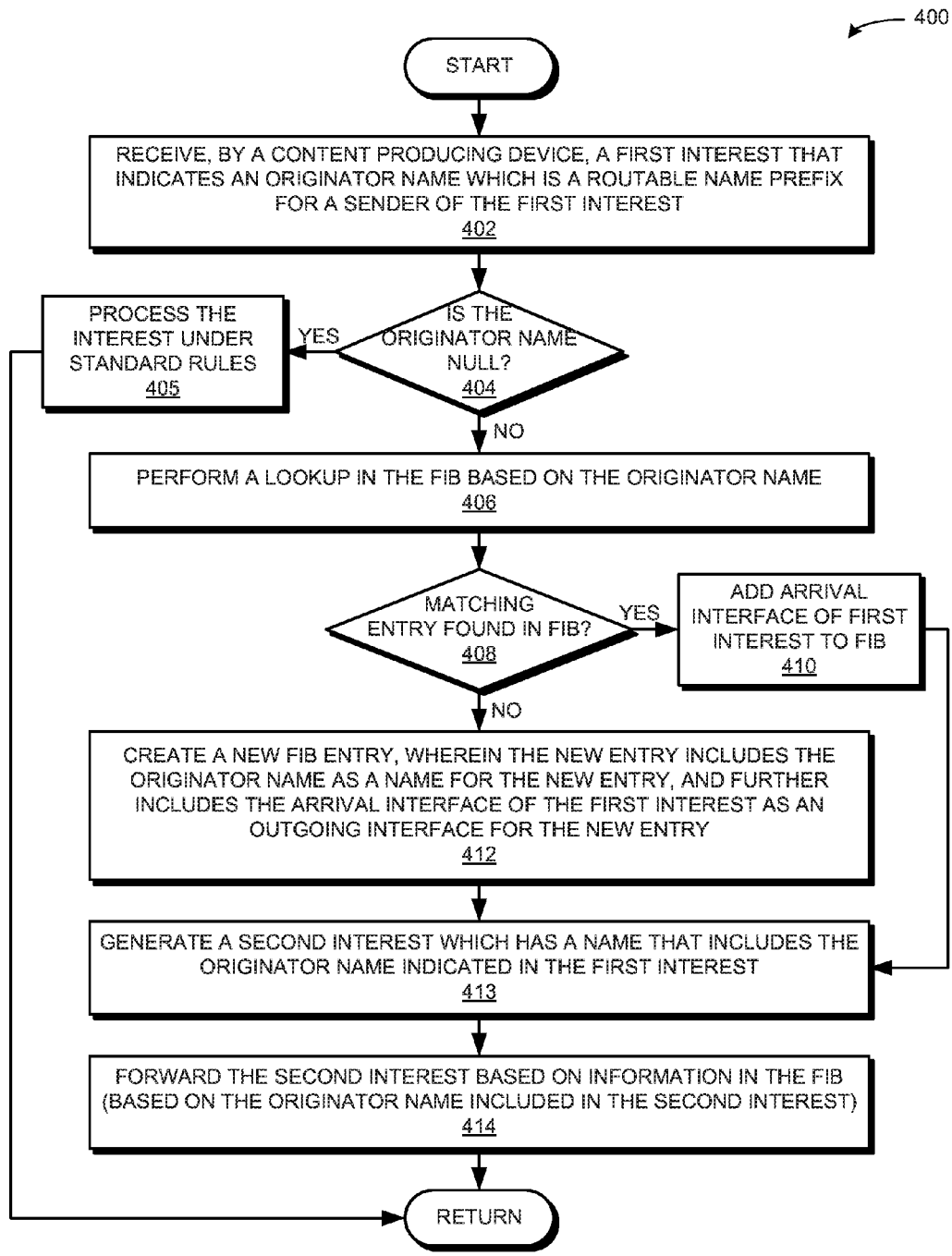
FIG. 4 presents a flow chart illustrating a method by a content producing device for processing an interest which includes proactive routing information, in accordance with an embodiment of the present invention.

FIG. 4 presents a flow chart 400 illustrating a method by a content producing device for processing an interest which includes proactive routing information, in accordance with an embodiment of the present invention. During operation, the system receives, by a content producing device, a first interest that indicates an originator name which is a routable name prefix for a sender of the first interest, wherein the originator name is used by the content producing device in a subsequent interest (operation 402). A name can be a hierarchically structured variable length identifier that includes contiguous name components ordered from a most general level to a most specific level, and the first interest can include a name. If the originator name is null (decision 404), the system processes the first interest under standard CCN rules (operation 405). For example, the producer can perform a lookup in its content store (CS) for a matching content object, and if it does not find the matching content in the CS, performing a lookup in a pending interest table (PIT) for an interest by the same name and updating the PIT as necessary. Subsequently, the producer can perform a lookup in its FIB to forward a responsive content object (or an ACK or NACK, if appropriate).

If the originator name is not null (decision 404), the system performs a lookup in the FIB based on the originator name (operation 406). If a matching entry is not obtained or found in the FIB (decision 408), the system creates or adds a new FIB entry, wherein the new entry includes the originator name as a name for new entry, and further includes the arrival interface of the first interest as an outgoing interface for the new entry (operation 412). The system generates a second interest which has a name that includes the originator name indicated in the first interest (operation 413). The originator name is an updated routable prefix for the sender of the "piggybacking" interest (e.g., the first interest). The system then forwards the second interest based on information for the name of the second interest in the FIB (e.g., based on the originator name included in the second interest) (operation 414). If a matching entry is found in the FIB (decision 408), the system adds the arrival interface of the first interest to the FIB (operation 410). The system can insert the arrival interface into the list of outgoing interfaces for the matching entry. The operation continues at operation 413 as described above.

Content Requesting Facilitates Proactive Routing Updates

Figure 5:
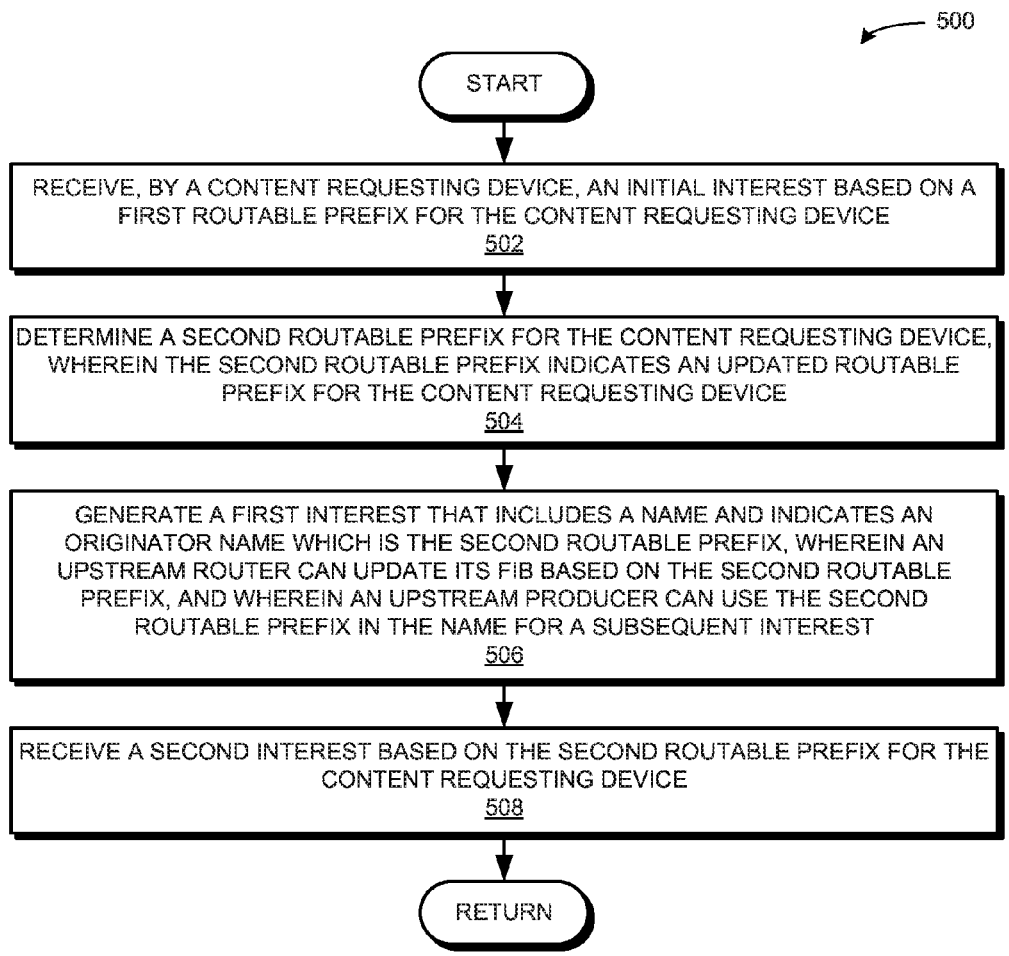
FIG. 5 presents a flow chart illustrating a method by a content requesting device for facilitating proactive routing updates, in accordance with an embodiment of the present invention.

FIG. 5 presents a flow chart 500 illustrating a method by a content requesting device for facilitating proactive routing updates, in accordance with an embodiment of the present invention. During operation, the system receives, by a content requesting device, an initial interest based on a first routable prefix for the content requesting device (operation 502). The system determines a second routable prefix for the content requesting device, wherein the second routable prefix indicates an updated routable prefix for the content requesting device (operation 504). The system generates a first interest that includes a name and indicates an originator name which is the second routable prefix, wherein an upstream router can update its FIB based on the second routable prefix, and wherein an upstream producer can use the second routable prefix in the name for a subsequent interest (operation 506). The system can subsequently receive a second interest based on the second routable prefix for the content requesting device (operation 508).

Exemplary Computer System

Figure 6:
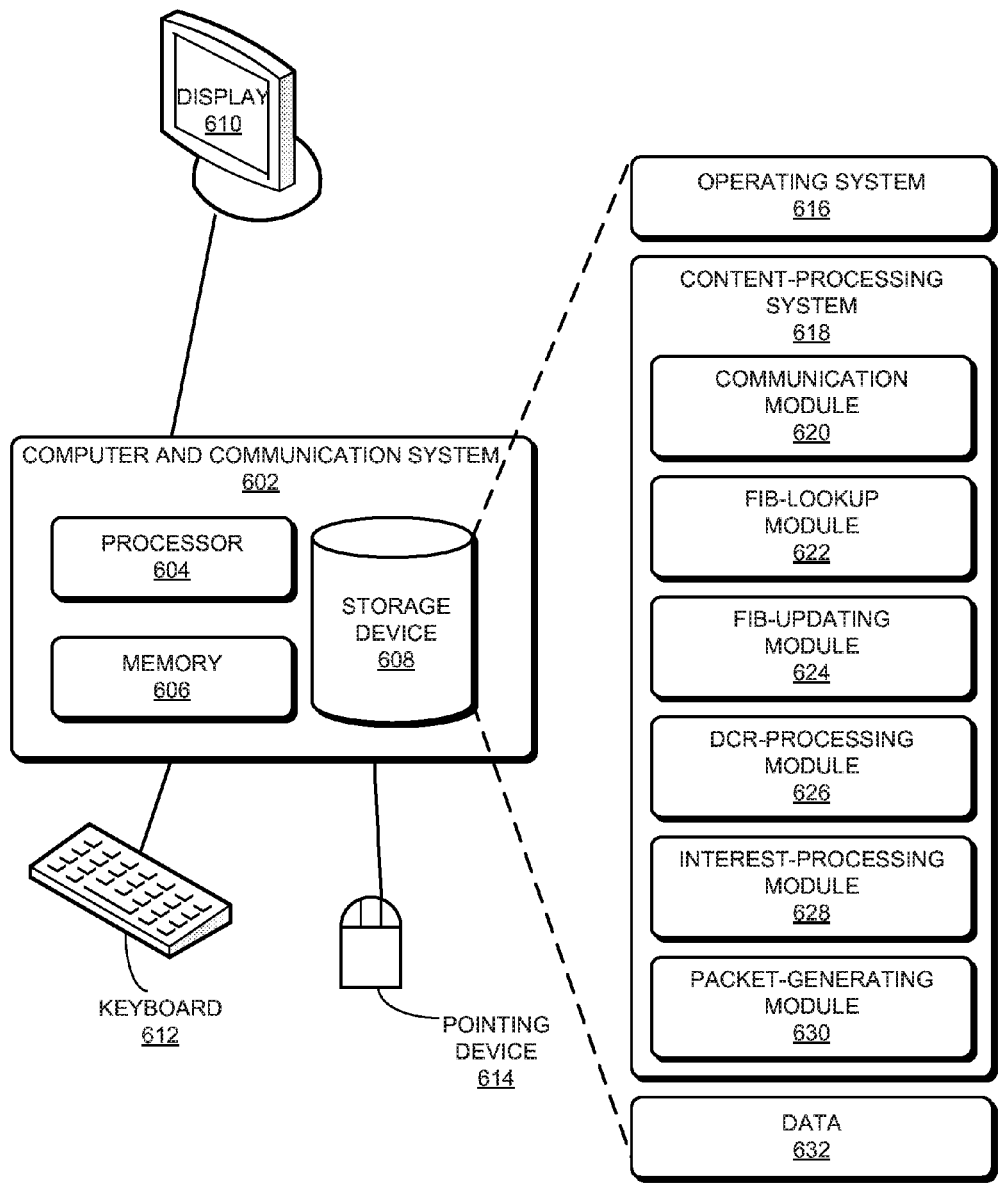
FIG. 6 illustrates an exemplary computer system that facilitates proactive routing updates, in accordance with an embodiment of the present invention.

FIG. 6 illustrates an exemplary computer system 602 that facilitates proactive routing updates, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 632.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, such as a content centric network (communication module 620). A data packet can include an advertisement, an interest packet, or a content object packet with a name which is an HSVLI that includes contiguous name components ordered from a most general level to a most specific level.

Further, content-processing system 618 can include instructions for receiving a first interest that indicates an originator name, wherein the originator is a routable name prefix for a sender of the first interest and is used by a content producing device in a subsequent interest (communication module 620). Content-processing system 618 can also include instructions for, in response to not obtaining a matching entry in a FIB based on the originator name (FIB-lookup module 622), adding a first entry to the FIB, wherein the first entry includes the originator name as a name for the first entry and further includes an arrival interface of the first interest as an outgoing interface for the first entry (FIB-updating module 624). Content-processing system 618 can include instructions for, in response to receiving the subsequent interest which has a name that includes the originator name (communication module 620), forwarding the subsequent interest to the outgoing interface for the first entry (communication module 620).

Content-processing system 618 can additionally include instructions for performing a lookup in the FIB based on the originator name to obtain the first entry (FIB-lookup module 622). Content-processing system 618 can include instructions for inserting routing information into a control process for a local routing algorithm, wherein the control process handles route updates from neighbor nodes, wherein the routing information is indicated in a reverse route update included in the first interest (operation DCR-processing module 626).

Content-processing system 618 can further include instructions for, in response to obtaining the matching entry in the FIB based on the originator name (FIB-lookup module 622), adding to the matching entry the arrival interface of the first interest as an outgoing interface for the matching entry (FIB-updating module 624). Content-processing system 618 can include instructions for, in response to determining that the originator name indicated in the first interest is null (interest-processing module 628), forwarding the first interest to one or more outgoing interfaces indicated in the FIB and corresponding to the name for the first interest (communication module 620). Content-processing system 618 can also include instructions for receiving the first interest in response to an advertisement of the content producing device for content under a domain of the content producing device (communication module 620).

Moreover, content-processing system 618 can include instructions for generating the subsequent interest which has a name that includes the originator name (packet-generating module 630). Content-processing system 618 can include instructions for forwarding the subsequent interest to the outgoing interface for a matching entry in the FIB (communication module 620). Content-processing system 618 can also include instructions for, in response to determining that the originator name indicated in the first interest is null, processing the first interest (interest-processing module 628). Content-processing system 618 can further include instructions for generating an advertisement for content under a domain of the content producing device (packet-generating module 630).

Data 632 can include any data that is required as input or that is generated as output by the methods and/or processes described in this disclosure. Specifically, data 632 can store at least: an interest; an advertisement; a content object; a name; a name that is an HSVLI that includes contiguous name components ordered from a most general level to a most specific level; a routable prefix or a name prefix that indicates one or more contiguous name components beginning from the most general level; an originator name which is a routable name prefix; an interest with a name that includes the originator name; a forwarding information base (FIB); a FIB entry; an arrival interface corresponding to a packet; a hop count; a reverse route update which indicates routing information from a neighbor node; a reverse route update for one or more name prefixes; a FIB entry with a name, a list of outgoing interfaces, a hop count, and a reverse route update; a distance to an originator or content requesting device; a pending interest table (PIT); a content store or local cache; a control process for a local routing algorithm; a route update from a neighbor node; an advertisement for content under a domain of a content producing device; an interest which does not require a responsive content object; and an interest which does not leave state in a PIT.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating routing updates outside of a routing protocol, the system comprising:
   a processor; and
   a storage device storing instructions that when executed by the processor cause the processor to perform a method, the method comprising:
      receiving, by an intermediate node, a first interest that indicates an originator name, wherein a name is a hierarchically structured variable length identifier that includes contiguous name components ordered from a most general level to a most specific level, wherein the originator name is a routable name prefix for a sender of the first interest and is used by a content producing device in a subsequent interest;
      in response to not obtaining a matching entry in a forwarding information base based on the originator name, adding a first entry to the forwarding information base, wherein the first entry includes the originator name as a name for the first entry and further includes an arrival interface of the first interest as an outgoing interface for the first entry; and
      in response to receiving the subsequent interest which has a name that includes the originator name, forwarding the subsequent interest to the outgoing interface for the first entry,
      thereby facilitating the intermediate node to proactively update routing information outside of the routing protocol and based on routing information included in the first interest.

2. The computer system of claim 1, wherein in response to receiving the subsequent interest, the method further comprises:
   performing a lookup in the forwarding information base based on the originator name to obtain the first entry.

3. The computer system of claim 1, wherein the first interest includes a hop count, wherein the first entry further includes a distance to the sender as a value based on the hop count.

4. The computer system of claim 1, wherein the first interest includes a reverse route update which indicates routing information from a neighbor node of the intermediate node, wherein the reverse route update is for one or more name prefixes, and wherein the method further comprises:
   inserting the indicated routing information into a control process for a local routing algorithm, wherein the control process handles route updates from neighbor nodes.

5. The computer system of claim 1, wherein the method further comprises:
   in response to obtaining the matching entry in the forwarding information base based on the originator name, adding to the matching entry the arrival interface of the first interest as an outgoing interface for the matching entry.

6. The computer system of claim 1, wherein the first interest has a name, and wherein the method further comprises one or more of:
   in response to determining that the originator name indicated in the first interest is null, forwarding the first interest to one or more outgoing interfaces indicated in the forwarding information base and corresponding to the name for the first interest; and
   forwarding the first interest to the one or more outgoing interfaces indicated in the forwarding information base and corresponding to the name for the first interest.

7. The computer system of claim 1, wherein receiving the first interest is in response to an advertisement of the content producing device for content under a domain of the content producing device, and wherein the advertisement is an interest which does not require a responsive content object and does not leave state information in a pending interest table.

8. A computer system for facilitating routing updates outside of the routing protocol, the system comprising:
   a processor; and
   a storage device storing instructions that when executed by the processor cause the processor to perform a method, the method comprising:
      receiving, by a content producing device, a first interest that indicates an originator name, wherein a name is a hierarchically structured variable length identifier that includes contiguous name components ordered from a most general level to a most specific level, wherein the originator name is a routable name prefix for a sender of the first interest and is used by the content producing device in a subsequent interest;
      in response to not obtaining a matching entry in a forwarding information base based on the originator name, adding a first entry to the forwarding information base, wherein the first entry includes the originator name as a name for the first entry and further includes an arrival interface of the first interest as an outgoing interface for the first entry;
      generating the subsequent interest which has a name that includes the originator name; and
      forwarding the subsequent interest to the outgoing interface for the first entry,
      thereby facilitating the content producing device to proactively update routing information outside of the routing protocol and based on routing information included in the first interest.

9. The computer system of claim 8, wherein the method further comprises one or more of:
   in response to determining that the originator name indicated in the first interest is null, processing the first interest; and
   performing a lookup in the forwarding information base based on the originator name to obtain the first entry.

10. The computer system of claim 8, wherein the first interest includes a hop count, wherein the first entry further includes a distance to the sender as a value based on the hop count.

11. The computer system of claim 8, wherein the first interest includes a reverse route update which indicates routing information from a neighbor node of the content producing device, wherein the reverse route update is for one or more name prefixes, and wherein the method further comprises:

inserting the indicated routing information into a control process for a local routing algorithm, wherein the control process handles route updates from neighbor nodes.

12. The computer system of claim 8, wherein the method further comprises:

in response to obtaining the matching entry in the forwarding information base based on the originator name, adding to the matching entry the arrival interface of the first interest as an outgoing interface for the matching entry.

13. The computer system of claim 8, wherein the method further comprises:

generating an advertisement for content under a domain of the content producing device, wherein the advertisement is an interest which does not require a responsive content object and does not leave state information in a pending interest table, and wherein receiving the first interest is in response to generating the advertisement.

14. A computer-implemented method for facilitating routing updates outside of a routing protocol, the method comprising:

receiving, by an intermediate node, a first interest that indicates an originator name, wherein a name is a hierarchically structured variable length identifier that includes contiguous name components ordered from a most general level to a most specific level, wherein the originator name is a routable name prefix for a sender of the first interest and is used by a content producing device in a subsequent interest;

in response to not obtaining a matching entry in a forwarding information base based on the originator name, adding a first entry to the forwarding information base, wherein the first entry includes the originator name as a name for the first entry and further includes an arrival interface of the first interest as an outgoing interface for the first entry; and in response to receiving the subsequent interest which has a name that includes the originator name, forwarding the subsequent interest to the outgoing interface for the first entry, thereby facilitating the intermediate node to proactively update routing information outside of the routing protocol and based on routing information included in the first interest.

15. The method of claim 14, wherein in response to receiving the subsequent interest, the method further comprises:

performing a lookup in the forwarding information base based on the originator name to obtain the first entry.

16. The method of claim 14, wherein the first interest includes a hop count, wherein the first entry further includes a distance to the sender as a value based on the hop count.

17. The method of claim 14, wherein the first interest includes a reverse route update which indicates routing information from a neighbor node of the intermediate node, wherein the reverse route update is for one or more name prefixes, and wherein the method further comprises:

inserting the indicated routing information into a control process for a local routing algorithm, wherein the control process handles route updates from neighbor nodes.

18. The method of claim 14, further comprising:

in response to obtaining the matching entry in the forwarding information base based on the originator name, adding to the matching entry the arrival interface of the first interest as an outgoing interface for the matching entry.

19. The method of claim 14, wherein the first interest has a name, and wherein the method further comprises one or more of:

in response to determining that the originator name indicated in the first interest is null, forwarding the first interest to one or more outgoing interfaces indicated in the forwarding information base and corresponding to the name for the first interest; and forwarding the first interest to the one or more outgoing interfaces indicated in the forwarding information base and corresponding to the name for the first interest.

20. The method of claim 14, wherein receiving the first interest is in response to an advertisement of the content producing device for content under a domain of the content producing device, and wherein the advertisement is an interest which does not require a responsive content object and does not leave state information in a pending interest table.

\* \* \* \* \*